June 2, 1964 R. K. DAUGHERTY ETAL 3,135,048
TRAY PACK CUTTER
Filed June 23, 1961 6 Sheets-Sheet 1
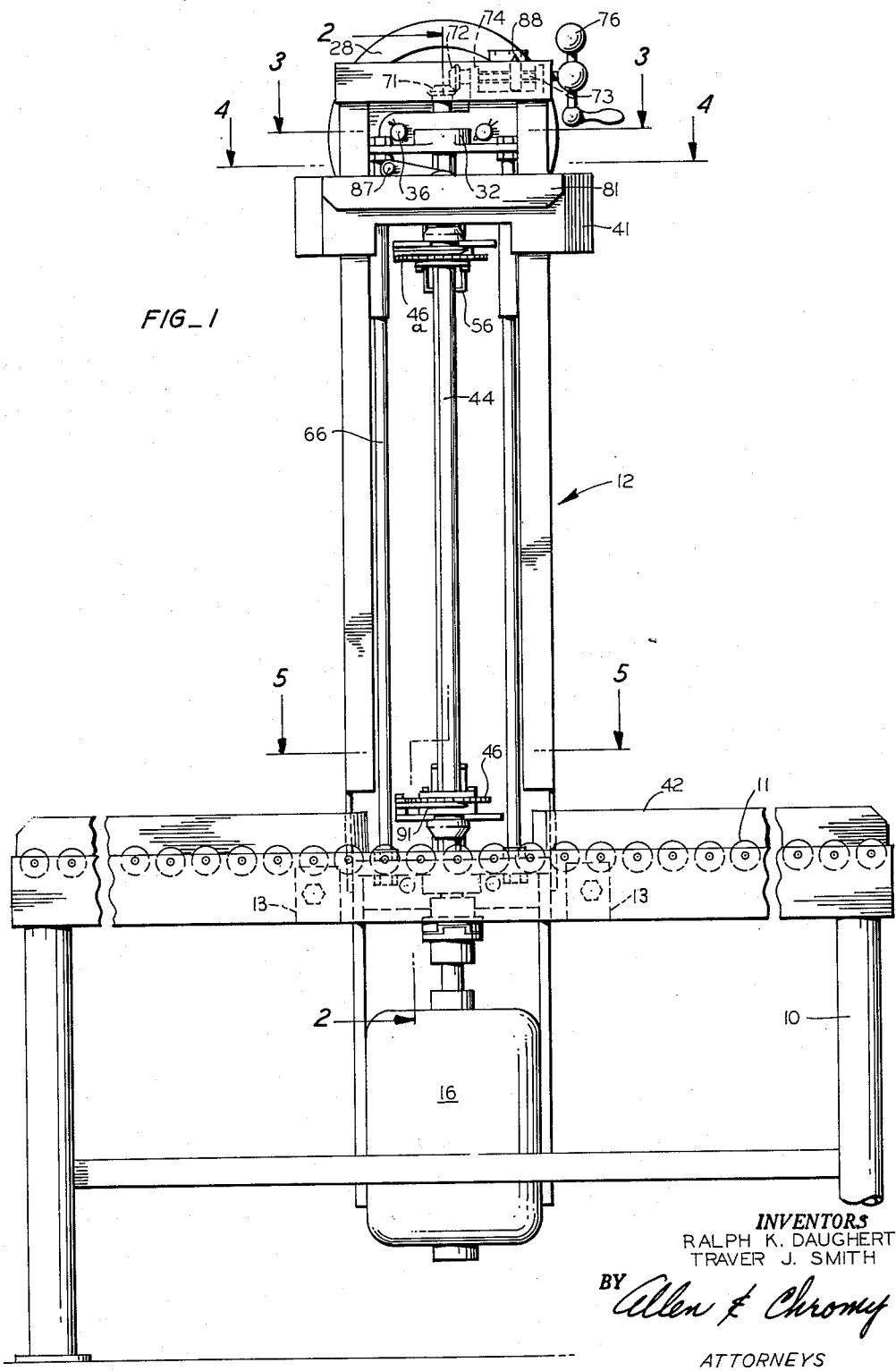
FIG_1
INVENTORS
RALPH K. DAUGHERTY
TRAVER J. SMITH
BY Allen & Chromy
ATTORNEYS

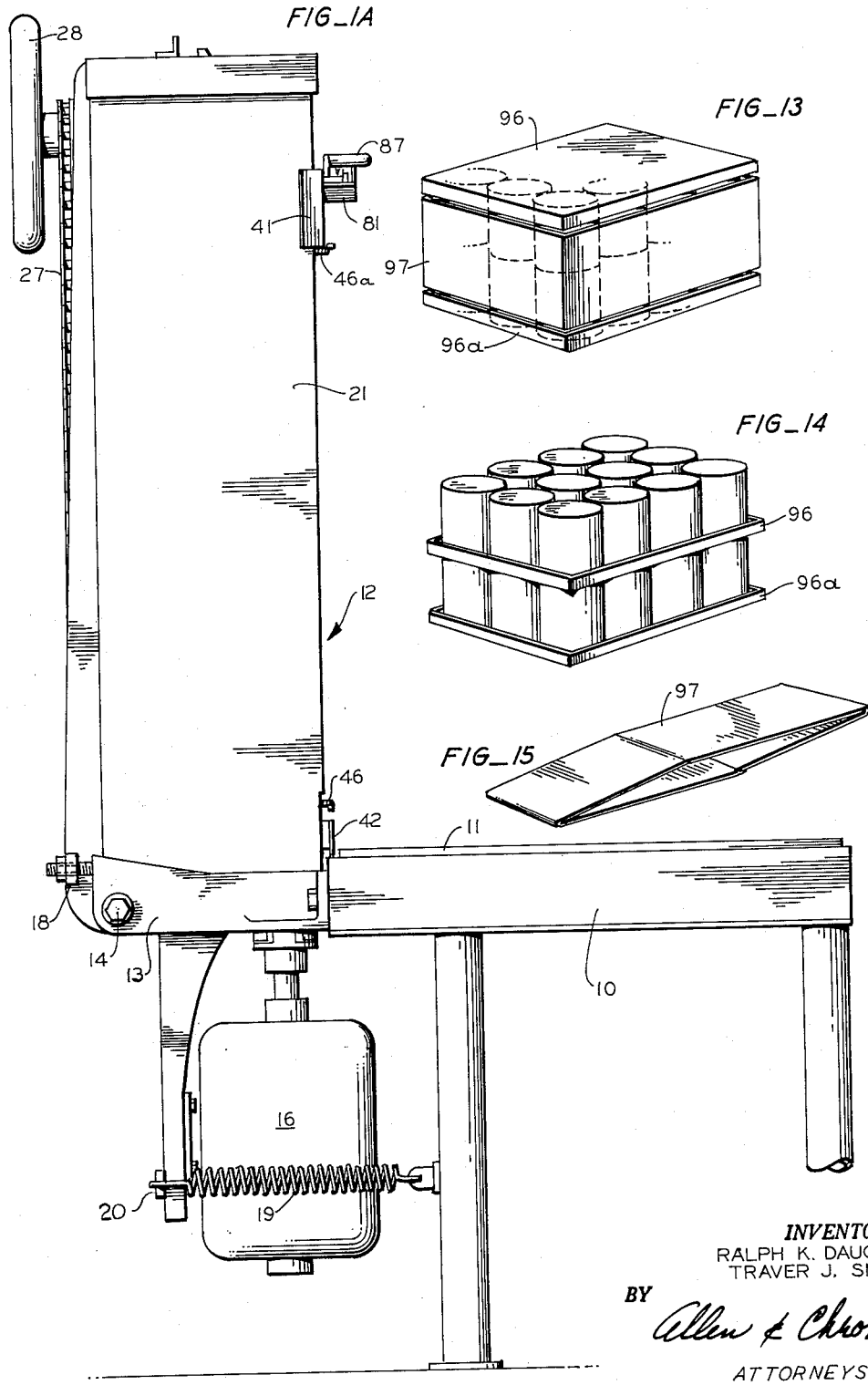

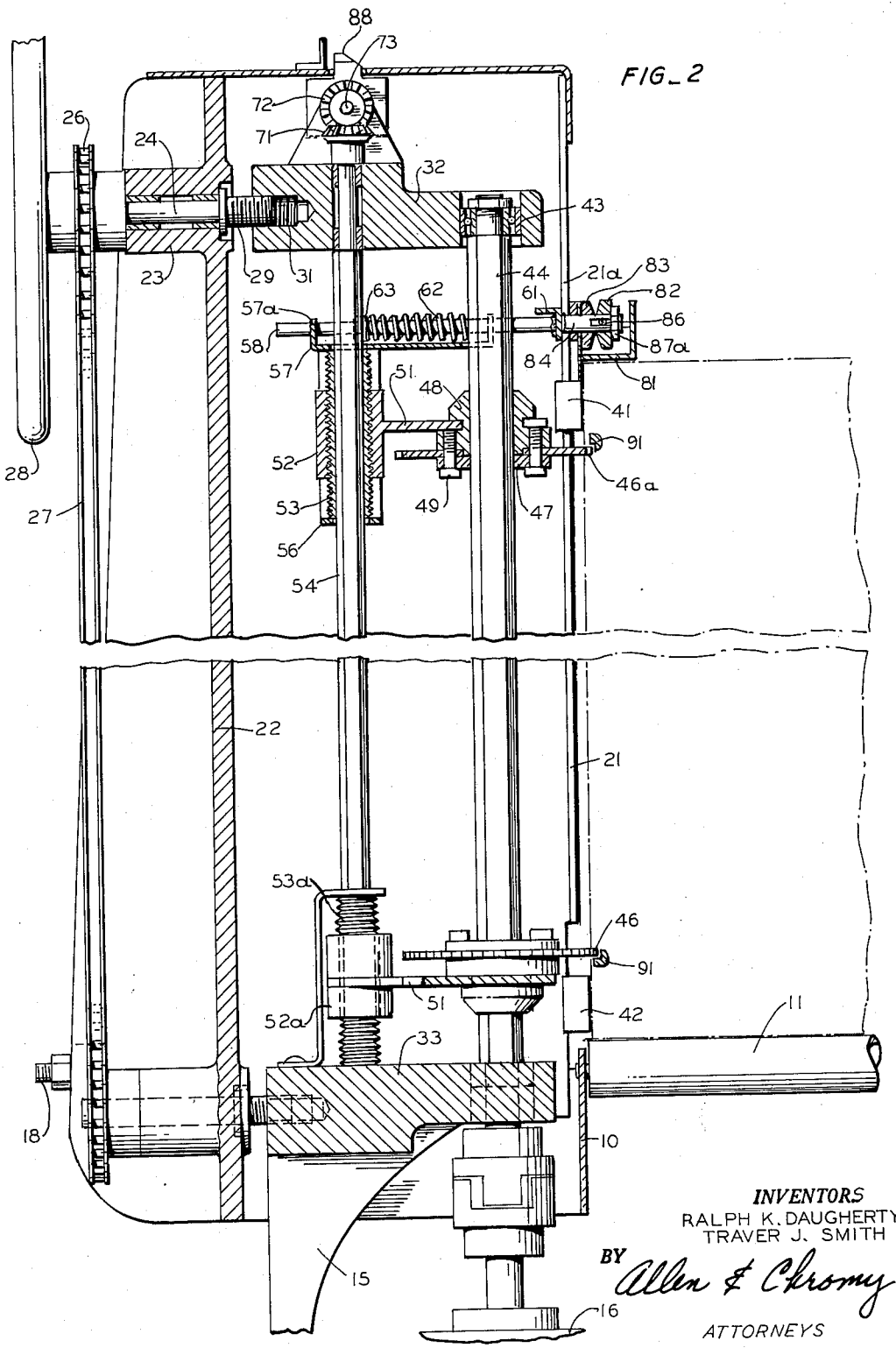

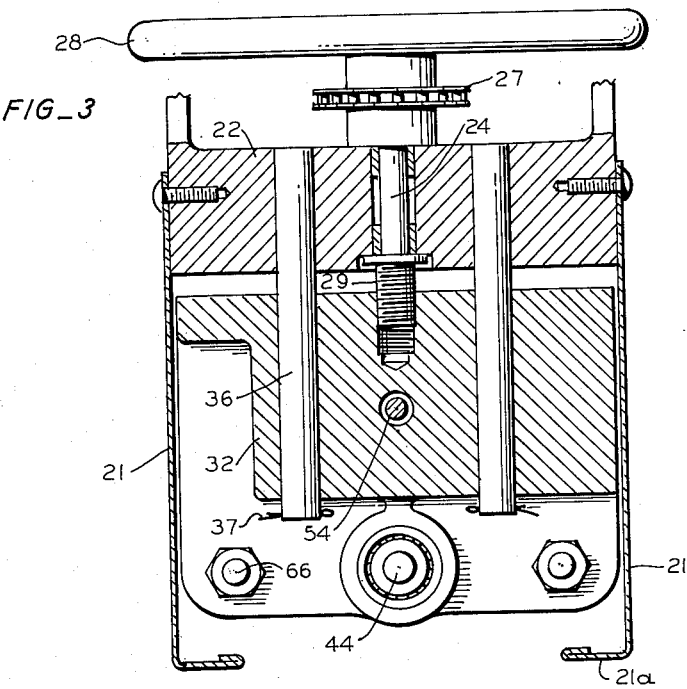
FIG_3
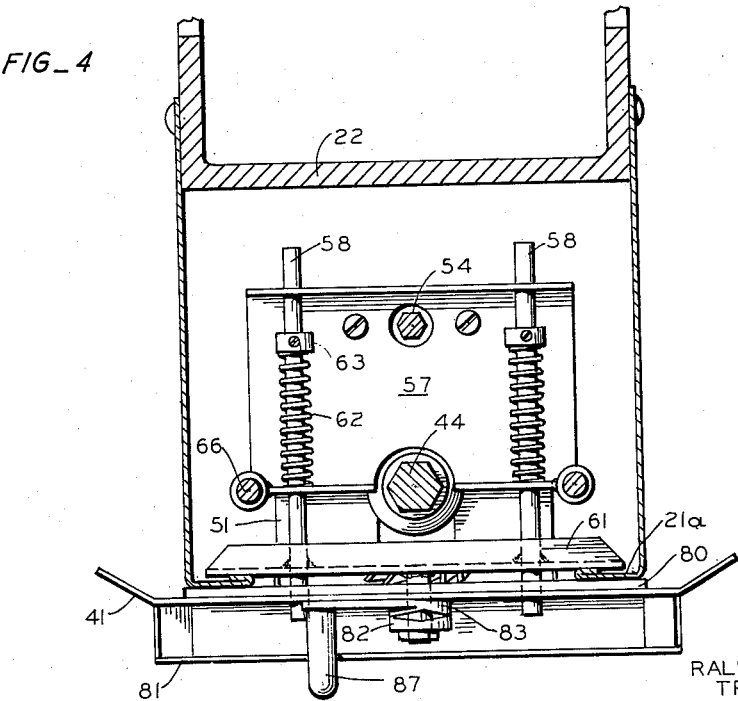
FIG_4

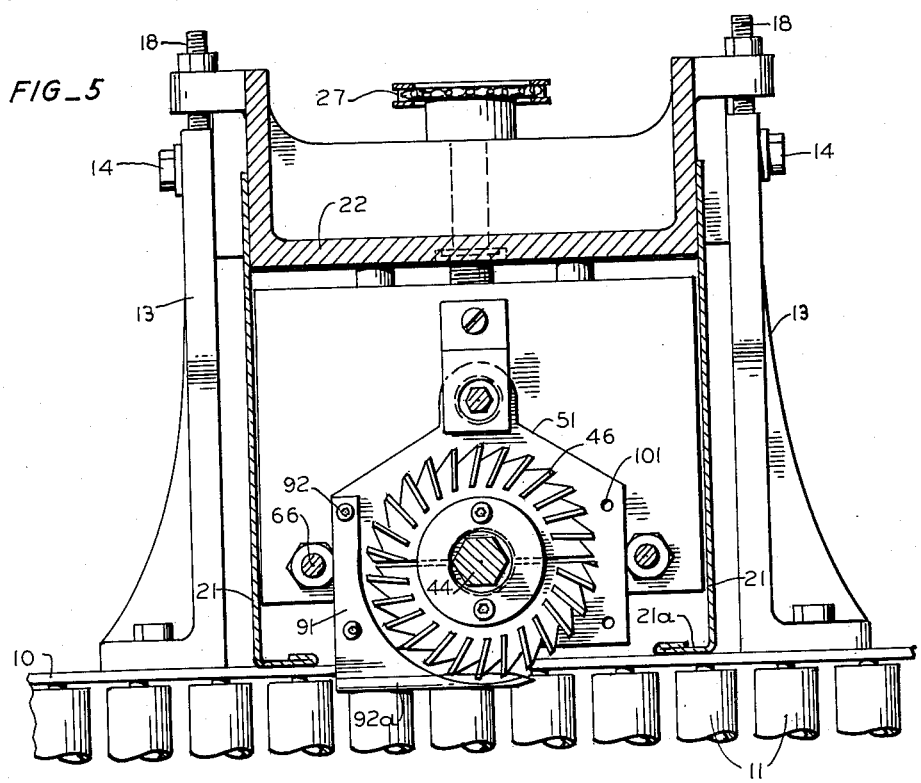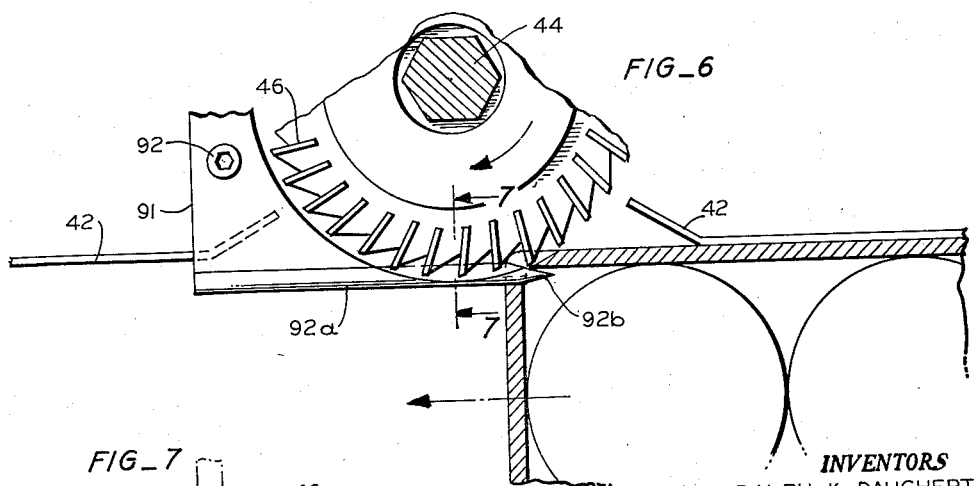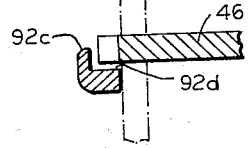

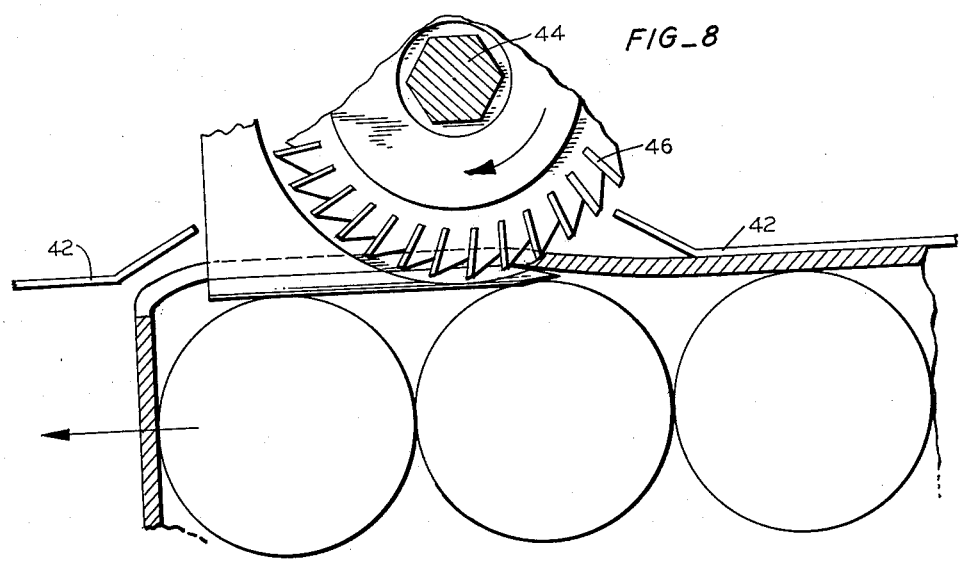
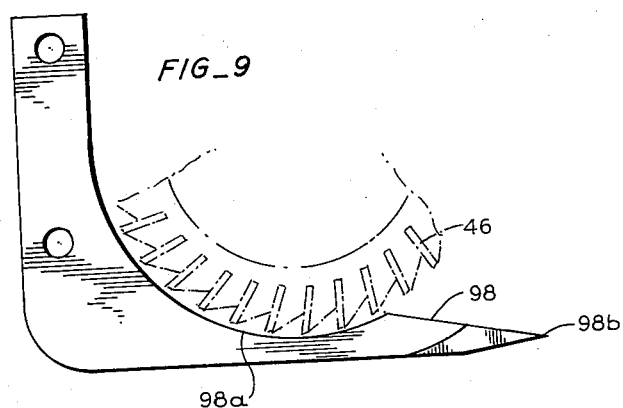
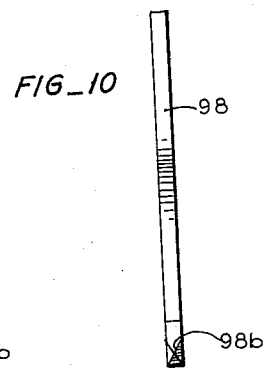
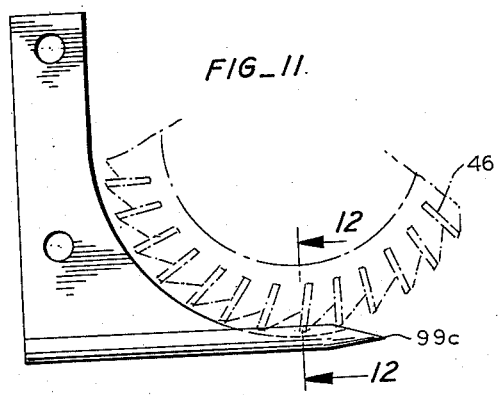
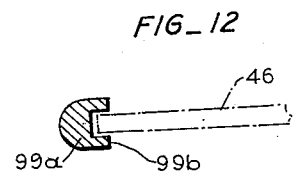

United States Patent Office 3,135,048
Patented June 2, 1964

3,135,048
TRAY PACK CUTTER
Ralph K. Daugherty and Traver J. Smith, both of San Jose, Calif., assignors, by mesne assignments, to Kutz-Kwik, Inc., Maywood, Ill., a corporation of Illinois
Filed June 23, 1961, Ser. No. 129,928
5 Claims. (Cl. 30—2)

The present invention relates to a cutter for cutting a case of goods such as cans or boxes of the type usually sold in supermarkets to provide article retaining trays from the top and the bottom of the case, respectively, and the invention is concerned particularly with an improved tray cutter which is useful with cases of varying size which will not harm the goods within the case. More specifically, the invention relates to improvements in devices of the type disclosed in the co-pending application of William N. Garwick and Ray E. Clark entitled Tray Pack Processing Cutter, filed August 5, 1960, Serial No. 47,671 and owned by an assignee in common with the subject invention.

In the display of merchandise for sale in supermarkets and the like, it has begun to be the practice to display merchandise in trays cut from the top of the case and from the bottom of the case so that the goods in a case are handled as a multiple unit or units and resulting in substantial saving and efficiency.

The present invention is designed to enable easy cutting of each case of goods to provide trays from the top and bottom respectively and to provide trays of uniform shape so as to be more attractive and to provide an economy in the tray cutting operation.

It is the general object of the invention to provide an improved tray cutter.

Another object of the invention is to provide a tray cutter which can follow the contour of the case being cut insofar as irregularities are concerned and which floats in and out with such irregularities.

Another object of the invention is to provide a tray cutter in which the case of goods is moved past the cutting knives which simultaneously cut the side walls of the case adjacent the top and bottom wall thereof so as to provide two trays for goods which are packed in two layers.

Another object of the invention is to provide an improved tray cutter employing a case-piercing guard member for piercing the case initially during the start of each cutting operation, which protects the contents of the case and prevents marring of the labels or packages.

A further object of the invention is to provide a tray pack cutter having an easy method of removing and replacing the cutting knife.

Other objects and advantages of the invention will be apparent from the following description of a preferred embodiment thereof, as illustrated in the accompanying drawings, in which:

FIG. 1 is a front elevational view of the tray pack cutter;

FIG. 1a is a side elevational view of the tray pack cutter taken from the left side of FIG. 1;

FIG. 2 is a sectional elevational view taken as indicated by the plane of the line 2—2 in FIG. 1;

FIG. 3 is horizontal sectional elevational view taken as indicated by the line 3—3 in FIG. 1;

FIG. 4 is a horizontal sectional view partially in elevation taken as indicated by the line 4—4 in FIG. 1;

FIG. 5 is a horizontal sectional elevation taken as indicated by the line 5—5 in FIG. 1;

FIG. 6 is a fragmentary enlarged view illustrating the operation of one of the cutting knives being generally similar to FIG. 5;

FIG. 7 is a fragmentary detailed section indicated by the line 7—7 in FIG. 6;

FIG. 8 is another enlarged operational view generally similar to FIGS. 5 and 6;

FIGS. 9 and 10 illustrate a modified form of case piercing guard;

FIG. 9 is a horizontal plan view of the piercer;

FIG. 10 is an elevational view as viewed from the right of FIG. 9;

FIGS. 11 and 12 illustrate a further modified form of a can piercer and guard;

FIG. 11 is a plan view;

FIG. 12 is a detail section taken in a plane indicated by the line 12—12 in FIG. 11;

FIG. 13 is a perspective view of a case of canned goods packed in two tiers, where the case is cut to form top and bottom trays by the cutter of the instant invention;

FIG. 14 is a perspective view showing the merchandise as displayed in the two trays cut from the case shown in FIG. 13;

FIG. 15 is a perspective view of the intermediate section of the case which is removed, which folds to a flat condition and can be easily stored or disposed of.

The tray pack cutter comprises generally a main frame 10 (FIGS. 1, 1a and 2) on which a series of conveyor rollers 11 are mounted, and an upright cutter mechanism indicated generally at 12. A pair of rearwardly extending brackets 13 are secured on the main frame 10 which provide a pivotal support axis by means of studs 14 for the cutter mechanism 12. The weight of the cutter mechanism, including the drive motor 16 carried by depending straps 15, is placed to the right of the pivotal axis 14 (FIG. 1a) so that there is a tendency to rotate the cutter mechanism 12 toward the space above the conveyor rollers 11 and correspondingly toward any case which is supported thereon for cutting. The extent of this movement is controlled by a pair of adjustable stop screws 18. Also the weight of the cutter mechanism 12 is partially counterbalanced by a pair of springs 19 (FIG. 1a), only one of which is seen, connected between the frame 10 and a bracket 20.

The cutter mechanism 12 (FIGS. 1, 1a and 2), comprises a cutter frame which is made up of a pair of side plates 21 and a rear casting 22 on which the side plates 21 are mounted. The cutter frame comprising the casting 22 is provided with respective upper and lower bosses 23 which journal similar shafts 24 which carry respective sprockets 26 connected by a chain 27, the upper shaft 24 carrying a handwheel 28. Both of the shafts 24 have threaded extensions 29 which are engaged with threaded recesses 31 in respective upper bearing block 32 and lower bearing block 33. Referring to FIG. 1 there is provided a pair of vertical guides 66 which extend between the lower bearing block 33 and upper bearing block 32 to secure these two bearing blocks together as an auxiliary frame unit. Each of the bearing blocks 32 and 33 is similarly mounted and referring to FIG. 3, the upper bearing block 32 is slidably supported on a pair of shafts 36 having a press-fit within the upper end of the frame casting 22. Suitable cotter pins 37 provide stops for the outward movement of the bearing blocks 32 and 33 with respect to the frame 22. By adjusting the handwheel 28, the spacing of the cutter frame with respect to the rollers 11 and a case thereon can be varied.

The adjustment of the cutter frame by means of the handwheel 28 and associated parts is used to make a preliminary adjustment of the machine to a particular carton wall thickness.

The front of the cutter frame is provided with an upper stop plate 41 for engagement by a case, as later described, and lower stop strips 42 which serve to determine the position of a case.

The upper bearing block 32 (FIG. 2) and the lower bearing block 33 have journaled therein by respective bearings 43 the reduced ends of the hexagonal shaft 44 which is the drive shaft for the cutters 46 and 46a, these cutters being made as split halves (FIG. 5) and being clamped between a clamp plate 47 and a collar 48 which are secured together by suitable bolts 49 with the cutter clamped therebetween. The collar 48 has an internal hexagonal shape to fit the shaft 44 slidably and non-rotatably. The collar 48 is grooved to receive a yoke plate 51 which projects outwardly from a sleeve member 52 which with the upper cutter 46a has a left-hand thread internally and is threadedly engaged with a similarly threaded thimble 53 which has an internal cross-section of hexagonal shape slidably engaging a hexagonal shaft 54. The upper end of the thimble 53 is secured in a U-shaped bracket 56 (FIGS. 1 and 2) which is secured at its upper end to a horizontally disposed plate 57 having upstanding flanges 57a carrying respective shafts 58 (see FIG. 4). The shafts 58 are slidably engaged with the upstanding flanges 57a and are secured as by welding to a clamping angle 61 which extends across the bent front portions 21a (FIG. 4) of the side plate 21. The shafts 58 receive compression springs 62 which are held between one flange 57a and respective collars 63 set-screwed to the shafts.

From the above description, it will be seen that as the auxiliary cutter frame (including the upper bearing block 32 and the lower bearing block 33) is moved in and out by the threaded connections including the threaded end 29 and handwheel 28, the springs 62 will be more or less compressed according to the extent of adjusting movement.

The hexagonal shaft 54 (FIG. 2) is connected similarly to the lower cutter unit 46 and its associated parts, these parts being identical except for the fact that the threaded portions of the sleeve 52a and the thimble 53a are right-hand threads rather than left-hand threads so that rotation of the hexagonal shaft 54 will either draw the two cutters closer together or will separate them. For this purpose, the upper end of the hexagonal shaft 54 which is suitably journaled in both the upper and lower bearing blocks 32 and 33 carries a bevel gear 71 meshing with a bevel gear 72 on a horizontal shaft 73 which is journaled in an extension 74 of the upper bearing block 32 and carries a handwheel 76.

The cutter is provided with an adjustment to the height of case to be cut into trays, and this height is guaged by an angle shaped stop 81 (FIGS. 1 and 2) which is secured on the upper horizontal case guide 41. The upstanding portion of this case guide 41 (FIG. 4) is apertured to receive the shafts 58 and carries a plate 80. The plate 80 and the angle 61 provide a clamping structure for the side plate front portions 21a of the casing to locate the stop 81 and the upper cutter 46a. To effect this clamping action, two washers 82 and 83 (FIGS. 2 and 4) are provided on the stud 84, the washer 82 being secured thereto by a crosspin 86, adjacent the nut 87a, and the inner washer 83 forming the hub of an operating handle 87.

The faces of the washers 82 and 83 are provided with the alternate high and low points so that when the high points are aligned as shown in FIG. 4 for example a clamping action takes place and by rotating the inner washer 83 through 90 degrees the clamp is loosened and the upper cutter and the associated assembly can be adjusted to the desired position.

When the upper cutter is adjusted to the desired position, the next operation would be to turn the handwheel 76 and adjust the cutters together or away from each other to adjust the depth of tray which is to be cut from the case. For this purpose an indicator 88, FIGS. 1 and 2, is provided on a threaded portion of the shaft 73 and reading against an appropriate scale.

Means is provided with each cutter for piercing a case for retaining the case portion and for guarding the contents of the case. The yoke plate 51 of the lower cutter 46 (FIGS. 2 and 5) for example carries a right-angled piercing and guard member 91 which is secured thereto by two bolts 92. This piercing and guard member has its piercing and guard portion 92a extending parallel to the direction of travel of the case in moving past the cutter, and at its case facing end is provided with a sharpened point 92b which can be caused to pierce the case as shown in FIG. 6 for example, the direction of movement of the cutter 46 being clockwise so as to aid the feeding of the case therepast. The V-shape of the point 92b is such as to cause it to cam away the contents of the case on the one hand and the walls of the case on the other hand. This action is illustrated in FIG. 8 where a cut has been partially made, the sharpened end always being ahead of the place where the cutting is effected. As seen in FIG. 7, the piercing and guard member has a recessed groove 92c in its upper face (in the case of the lower cutter) and overlapping horizontally the edge of the adjacent cutting teeth. In this way, the lower wall portion of the case which will become the wall of the actual tray cut from the case is supported on the inner edge of the piercing and guard member 92a at the time the cutting action is occurring so that a clean cut is effected. Also, as seen in FIG. 8, the member 92a is inside the wall of the case and serves to hold the case and cutter in engagement.

The point 92b which effects the piercing in the form of the invention shown in FIGS. 6 and 7 is located substantially in the plane of the surface 92d.

In operating the machine, a case is placed on the rollers 11 and the upper cutter 46a is adjusted so that the angle-shaped stop 81 engages the top of the case, and thereafter the position of the cutters are positioned vertically to control the height of the tray to be cut. Then the case is propelled along stops or guides 41 and 42 until the piercing point 92b pierces the wall of the carton adjacent a corner. The cutters 46 are being rotated, the motor 16 having been energized, and a cut is made through one side of the case as the case is progressed along. After this cut is completed, the case is rotated through 90 degrees and an adjacent wall is cut. The subsequent walls are cut in a similar fashion so that when the cutting operation is completed the case is in the condition shown in FIG. 13, an upper tray 96 having been cut, a lower tray 96a, and an intermediate throw-away section 97 having been severed from the two trays.

It will be noted referring to FIG. 5 that an additional pair of holes 101 are provided in the yoke plate 51 so that the guard piercing and retainer member 91 can be mounted at the opposite side, the cutter assembled to cut in the opposite direction, and the motor reversed in its direction of rotation. In this way, the apparatus can be adjusted to the installation conditions prevailing in a particular supermarket.

Where the case is a single tier pack, and only one tray is required per case, the upper cutter 46a is moved to an inactive position and only the lower one is left active during the cutting operation.

Referring to FIGS. 9 and 10, a modified form of piercing and guard member 98 is shown, also having a general L-shape, and having its inner surface contoured at 98a to conform to the outline of the cutter, and having a sharpened point 98b.

In the form of the invention shown in FIGS. 11 and 12, the piercing and guard member is again L-shaped having the leg of the L formed adjacent to the cutter provided with a rounded outer surface 99a and having two flanges 99b overlapping the cutter at the top and the bottom, the sharpened point 99c being midway between the flanges 99b. In this form of the invention the wall of the carton both above and below the cutter is held. The point 99c being positioned in the area of the cut on one side is positioned to enter in the cut on a succeeding side.

It will be noted that the floating mounting of the cutter frame 12, which is yieldably urged to the right as viewed in FIGS. 1a and 2, i.e. toward the case, will result in the engagement of the piercing and guard member 91 within the case and in the movement of the whole cutter frame in an out to follow any irregular contour of the case due to slight denting or malformation of the case. Also, it will be noted that once the cutter is adjusted to handle a particular size case, all four sides of the case, and successive cases as well, can be handled without readjustment.

While we have shown and described a preferred embodiment of the invention, it will be apparent that the invention is capable of variation and modification from the form shown, so that the scope thereof should be limited only by the proper scope of the claims appended hereto.

What I claim is:

1. A tray pack cutter comprising a horizontal carton-supporting table, a vertical framework secured to one edge of said table, a pair of horizontally spaced vertical supports in said framework, a rotary cutter blade horizontally mounted on said supports with portions thereof overhanging said table, means mounting said cutter blade for sliding movement on said supports, means for retaining said cutter blade in a selected position on said supports, a spear member associated with said cutter blade and adapted to penetrate a carton of goods and be interposed between a carton wall and the goods to shield the goods from contact with said cutter blade, and vertical guide means in horizontal alignment with said table edge for properly positioning a carton wall to be cut by said cutter blade.

2. A tray pack cutter comprising a horizontal carton-supporting table, a vertical framework secured to one edge of said table, a pair of vertically spaced rotary cutter blades horizontally mounted in said framework with portions thereof overhanging said table edge, means mounting the upper of said cutter blades for vertical movement in said framework, means for retaining said upper cutter blade in a selected vertical position, a spear member associated with each of said cutter blades and adapted to penetrate a carton of goods and be interposed between a carton wall and the goods to shield the goods from contact with said cutter blades, and vertical guide means in horizontal alignment with said table edge for properly positioning a carton wall to be simultaneously cut by both of said cutter blades.

3. The tray pack cutter of claim 2 in which a carton top guide is associated with said upper cutter blade and adapted to move vertically therewith as a unit.

4. The tray pack cutter of claim 3 in which means is provided in said framework in association with said cutter blades whereby said cutter blades may be simultaneously moved vertically in opposite directions.

5. A tray pack cutter comprising a horizontal carton conveyor table, a vertical framework secured to one edge of said table, a pair of horizontally spaced vertical supports in said framework, a vertical driveshaft in said framework and positioned horizontally between said supports, a pair of horizontal rotary cutter blades non-rotatably but slidably mounted on said driveshaft, means mounting said cutter blades for slidable vertical movement on said supports, means associated with the upper of said cutter blades for retaining the same in a selected position on said supports, a carton top guide associated with said upper cutter blade and adapted to move therewith as a unit, adjustment means in said framework for simultaneously moving said cutter blades vertically in opposite directions whereby said cutter blades are adapted to cut a pair of trays of identical depth from a carton, and a spear member associated with each of said cutter blades, said spear members adapted to penetrate a carton of goods and be interposed between a carton wall and the goods to shield the goods from contact with said cutter blades.

References Cited in the file of this patent

UNITED STATES PATENTS

| | | |
|---|---|---|
| 1,299,335 | Hazeltine | Apr. 1, 1919 |
| 2,022,433 | Roemer | Nov. 26, 1935 |
| 2,485,449 | Kirsch | Oct. 18, 1949 |
| 2,729,885 | Wahl | Jan. 10, 1956 |

FOREIGN PATENTS

| | | |
|---|---|---|
| 3,521 | Great Britain | Dec. 19, 1896 |